Figure 1:
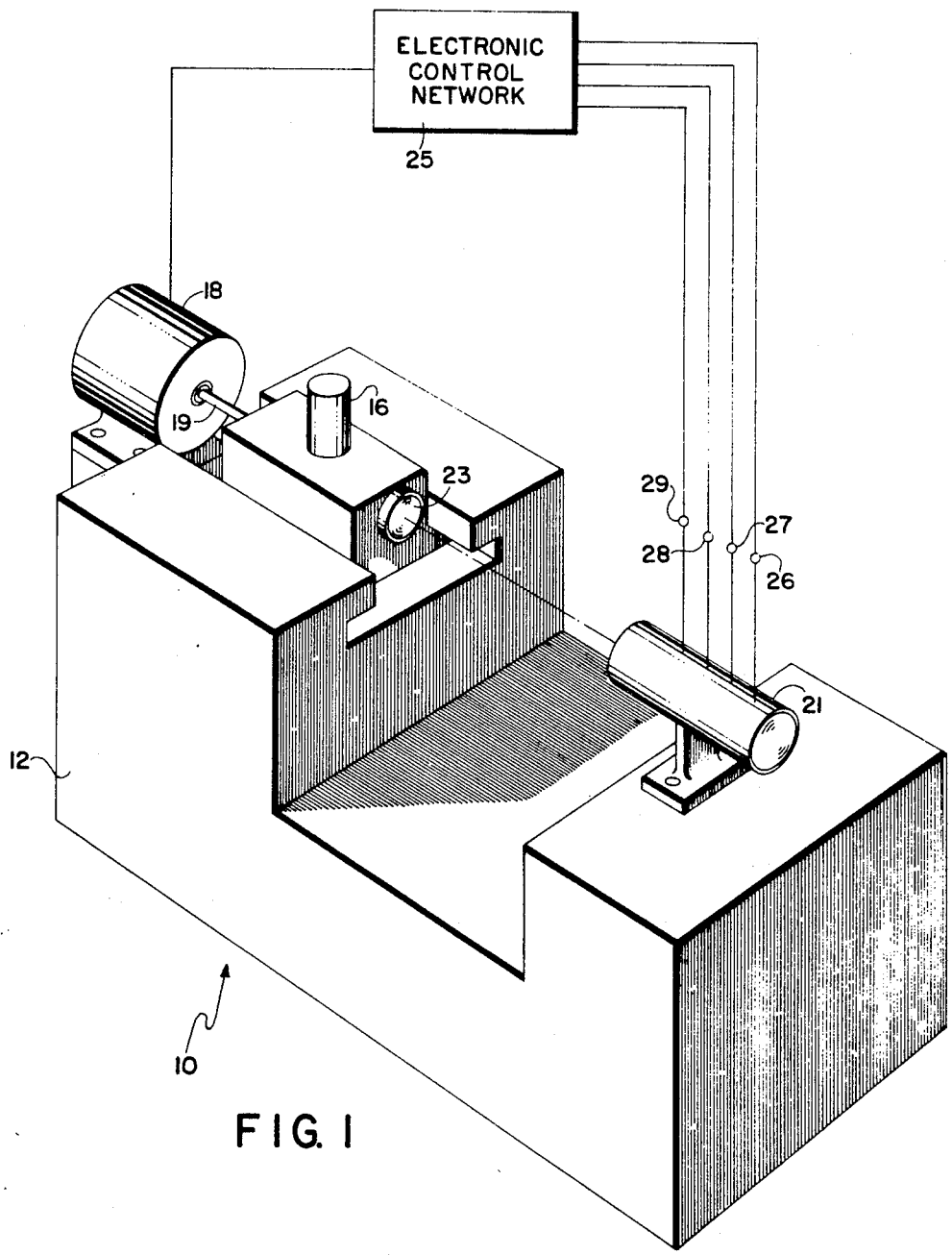

[11] 3,634,682

[72] Inventor  Nathan Gold
                Framingham, Mass.
[21] Appl. No. 11,123
[22] Filed     Feb. 13, 1970
[45] Patented  Jan. 11, 1972
[73] Assignee  Polaroid Corporation
                Cambridge, Mass.

[54] LASER INTERFEROMETER-TYPE SERVO-POSITIONING SYSTEM COMPRISING VELOCITY CONTROL NETWORK AND PHASE-LOCK NETWORK
    39 Claims, 6 Drawing Figs.

[52] U.S. Cl. .................................................. 250/201,
                                    318/640, 356/106, 356/110
[51] Int. Cl. ........................................................ G01b 9/02,
                                                                G01j 1/20
[50] Field of Search ............................................. 250/201;
                                    356/106, 110; 318/640

[56]            References Cited
            UNITED STATES PATENTS
3,539,256  11/1970   Ables ........................... 356/106 X Primary Examiner—Archie R. Borchelt
Assistant Examiner—T. N. Grigsby
Attorneys—Brown and Mikulka, William D. Roberson and Michael Bard ABSTRACT: A precision servo-positioning system is provided for moving a stable platform to a predetermined position with extremely fine accuracy. Basically, a laser interferometer is utilized to detect changes in the position of the stable platform and provides output signals to an electronic control network which in turn provides input signals to a motor used to drive the platform.

The electronic control network includes a velocity control network, a phase-lock network, and a velocity feedback network. The velocity control network provides a DC level input signal to the motor driving the platform such that the platform will be caused to attain a predetermined velocity and includes means for monitoring the output signals from the laser interferometer and determining velocity information therefrom. The velocity control network converts this velocity information into a DC level which is negatively fed back to the motor so as to null the input thereto when the platform has achieved a predetermined velocity. Once the platform has achieved such predetermined velocity, it continues to move under its own momentum.

As the moving platform approaches a predetermined position, at its predetermined velocity, the velocity control network is switched off and a phase-lock network is switched on to bring the moving platform to rest at such predetermined position. The phase-lock network incorporates a reference signal source and compares the output signals from the laser interferometer with the signal from said reference to generate an error signal indicative of the phase difference between the setting of said reference signal source and said laser output signals. When the phase difference between the reference signal source setting and the signals from the laser interferometer is a predetermined amount the error signal will be 0. This error signal is fed back to the motor, which drives the stable platform, and is polarity sensitive to the phase difference between the laser interferometer output signals and the reference signal source setting. Thus, the phase-lock network will provide signals to the motor tending to drive the platform toward the predetermined position at which the error signal will be 0.

A velocity feedback network is used in conjunction with the phase-lock and provides negative feedback signals to the motor so as to oppose the velocity of the platform. Thus, the velocity feedback network serves to prevent the platform from overshooting the predetermined position and entering a cogging mode.

FIG. I

INVENTOR.
NATHAN GOLD

LASER INTERFEROMETER-TYPE SERVO-POSITIONING SYSTEM COMPRISING VELOCITY CONTROL NETWORK AND PHASE-LOCK NETWORK

BACKGROUND OF THE INVENTION

The subject invention relates generally to positioning systems, and, more particularly, to a servo-controlled system, incorporating phase-lock and velocity feedback networks, for precisely positioning a sliding platform.

It is well known that various types of apparatus have been employed in prior art devices for precisely positioning a sliding platform. Typically, such a prior art system comprised a synchro generator for supplying control signals to a servomotor, in turn driving a precision lead screw threadably engaging the sliding platform. Rotation of the synchro generator to a predetermined position effected a like rotation of the servomotor and its associated lead screw causing linear movement of the sliding platform to a predetermined position.

Additional accuracy was obtained in such prior art systems by incorporating velocity feedback. The velocity feedback employed was often of the tachometer type wherein a tachometer generator was connected to the lead screw so as to provide an output signal indicative of the velocity thereof which in turn was negatively fed back to the input of the servomotor to provide more precise velocity and position control.

Nevertheless, prior art positioning systems, of the type above-described, were limited with respect to their prospective utility in many applications. By way of example, it is desirable to be able to position a lens (either for the shaping or measurement thereof) with an accuracy exceeding that of the prior art by several orders of magnitude. Typically, it is desired to linearly position the lens within 10 microinches over a total traversed distance of several inches.

It was in response to this need for an extremely precise positioning system for a slideable platform that the subject invention was conceived. Significantly, the novel invention herein described has been found to achieve positional accuracy in the range of 3 microinches over a total traverse of 4 inches, using state of the art materials. With improvement in the state of the art materials the principles herein described may be utilized to improve the attainable accuracy by many orders of magnitude.

SUMMARY OF THE INVENTION

The present invention contemplates a stable positioning platform slideably mounted on a base, as by air bearings. The positioning platform is driven by a linear motor which receives velocity control signals from an electronic control network. A laser interferometer is secured to the base and incorporates a retroreflector secured to one end of the platform so as to receive and transmit light energy. The laser interferometer receives light energy reflected thereto by the retroreflector and compares such energy with the light energy transmitted to the retroreflector to effect electrical output signals indicative of the change of position of the platform.

The electrical output signals from the laser interferometer are fed to the electronic control network which determines the velocity of the platform and compares it with the velocity determined by the velocity control input to the linear motor so as to generate an error signal, corresponding to the difference therebetween, which serves to move the platform at a constant velocity. The electronic control network also compares the phase of the output signals from the laser interferometer with the phase of the setting of a reference signal source and generates an error signal corresponding to the phase difference therebetween. This phase difference error signal from the electronic control network is supplied to the linear motor, at the appropriate time, so as to cause the platform to seek a position such that the phase of the output signals from the laser interferometer bears a predetermined relationship with the phase of the setting of the reference signal source.

It should be noted that the phase of the output signals from the laser interferometer varies with the position of the platform which, therefore, must be brought to rest at a predetermined position corresponding to the phase of the setting of the reference signal source.

The electronic control network also includes a velocity feedback network which determines the instantaneous velocity of the platform from the output signals of the laser interferometer and negatively feeds back a signal, indicative of such instantaneous velocity, to the linear motor so as to prevent the platform from sliding past its predetermined position, under the influence of its own momentum, and entering a cogging mode.

Accordingly, it is an object of the present invention to provide a means for precisely positioning a slideable platform.

Another object of the instant invention is to provide a means for precisely positioning a slideable platform by using a laser interferometer to detect changes in the position of said platform.

Still another object of this invention resides in using a laser interferometer to detect a change in the position of a slideable platform and provide an electrical output signal, phase dependent upon the position of said platform, whereby the output signal from the laser interferometer may be compared with that from a reference signal source such that the platform may be caused to seek a position whereat the phase difference between the laser interferometer output signal and the setting of the reference signal source is a predetermined amount.

Yet another object of this invention resides in the use of a laser interferometer to detect the change of position of a slideable platform so as to provide an output signal indicative thereof and electronically determining velocity information from said signal, whereby the velocity of said platform may be precisely regulated.

A further object of this invention is to provide a servo-positioning system for a slideable platform by generating a pair of phase-differing output signals each of which is phase dependent upon the position of said platform and comparing said phase-dependent output signals with a pair of nonoscillatory amplitude differing input signals to effect an error signal which approaches zero as said platform approaches a predetermined position.

Yet a further object of the instant invention resides in the provision of means for detecting the instantaneous velocity of said platform from a predetermined one of a pair of signals phase dependent upon the position of said platform and feeding a signal indicative of such instantaneous velocity back to said linear motor, during a predetermined portion of a predetermined one of each of said pair of phase-dependent signals.

Figure 2:
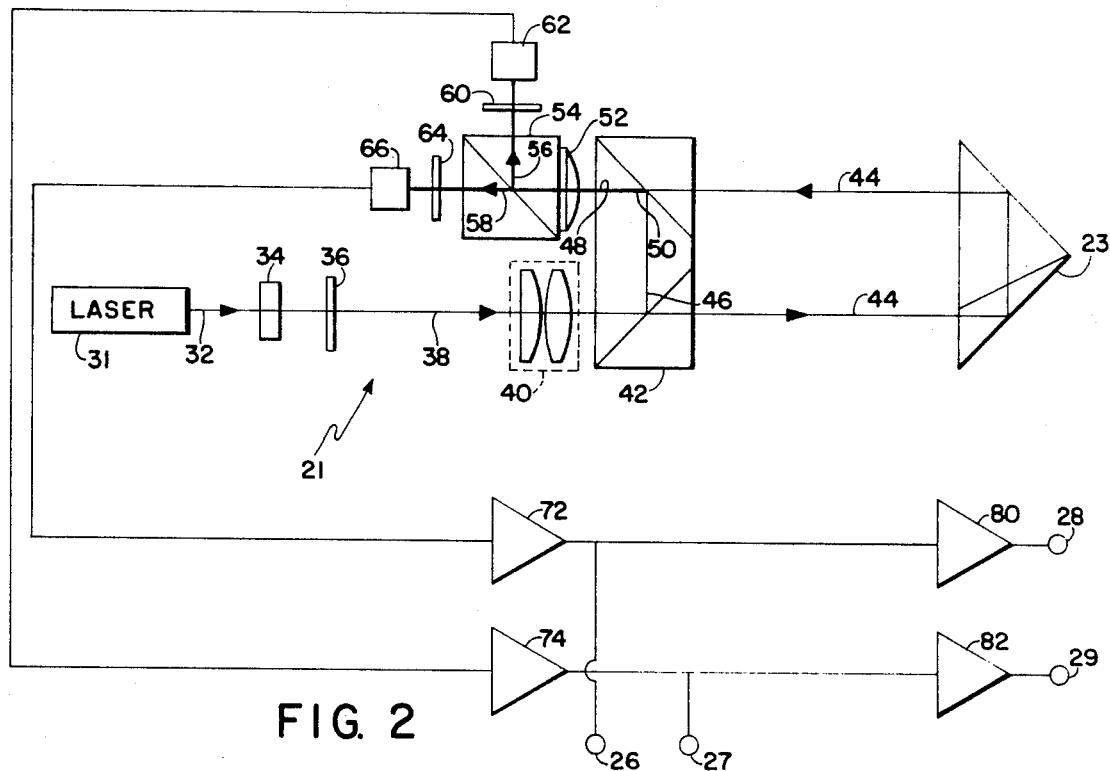
Figure 3:
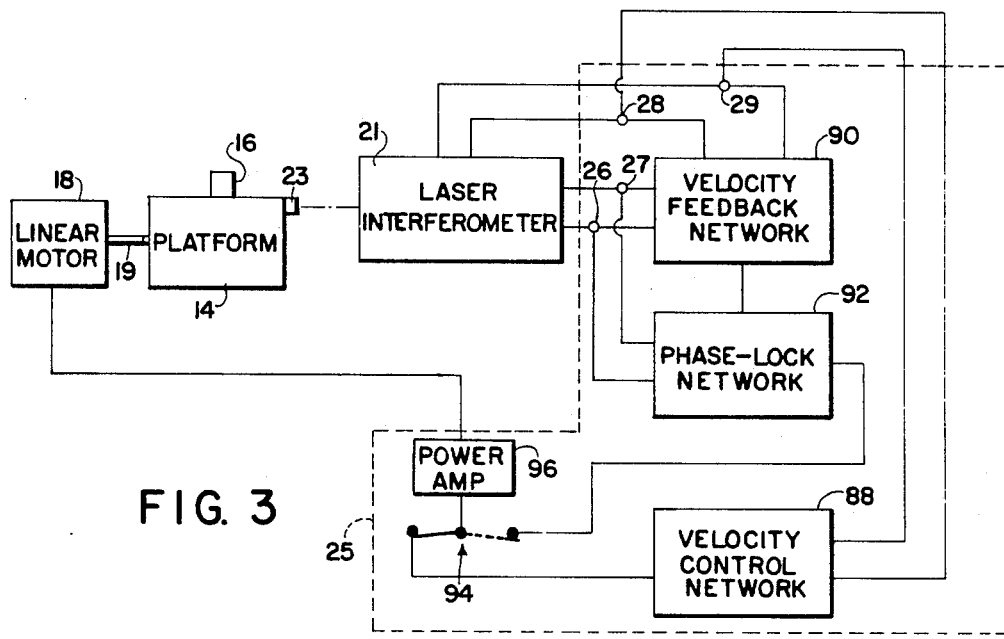
Figure 4:
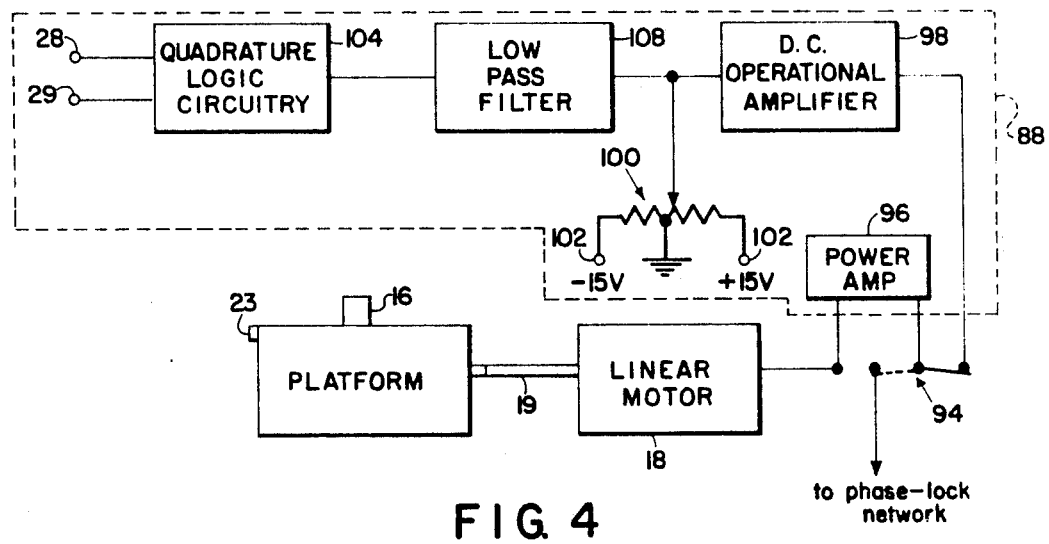
Figure 5:
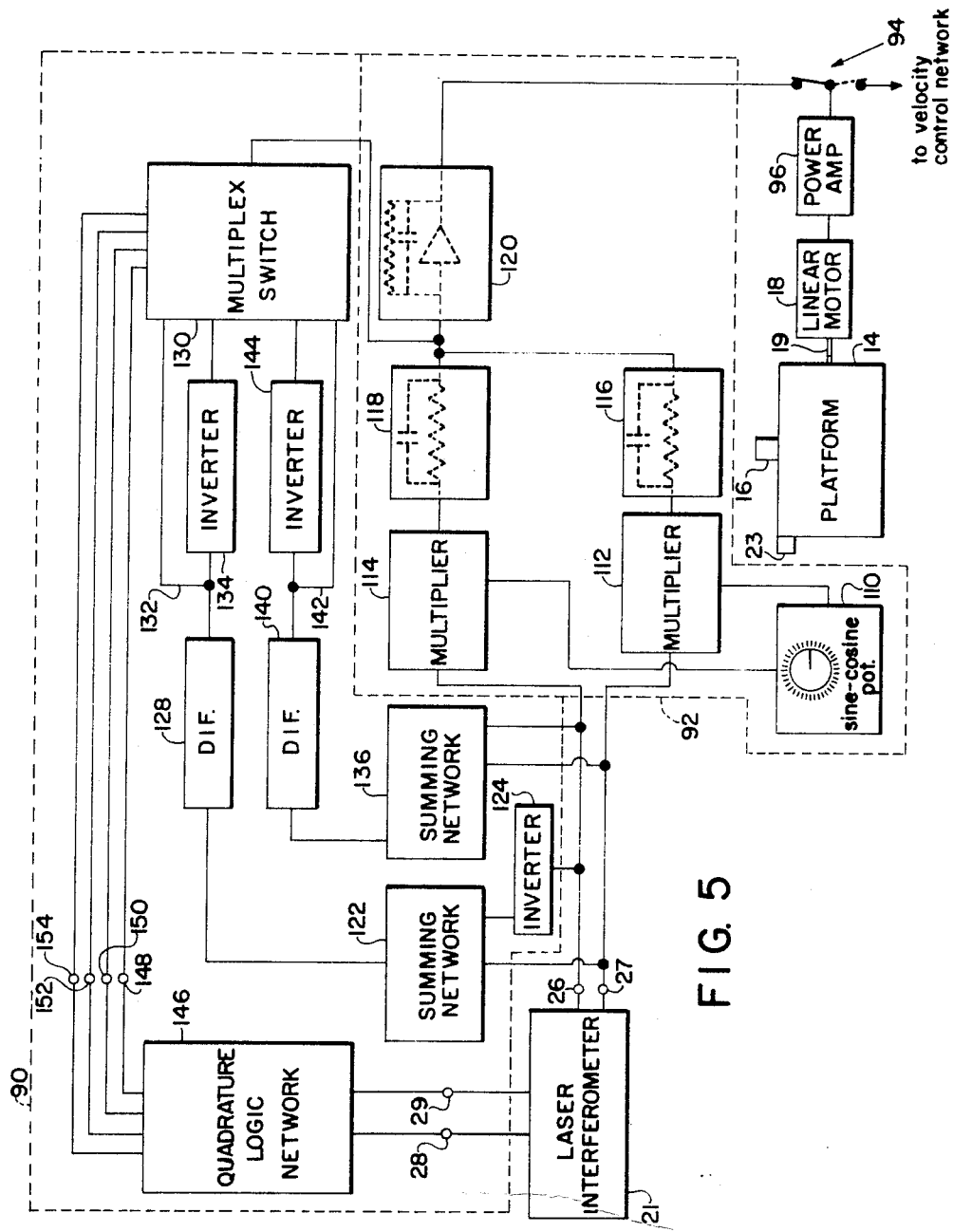
Figure 6:
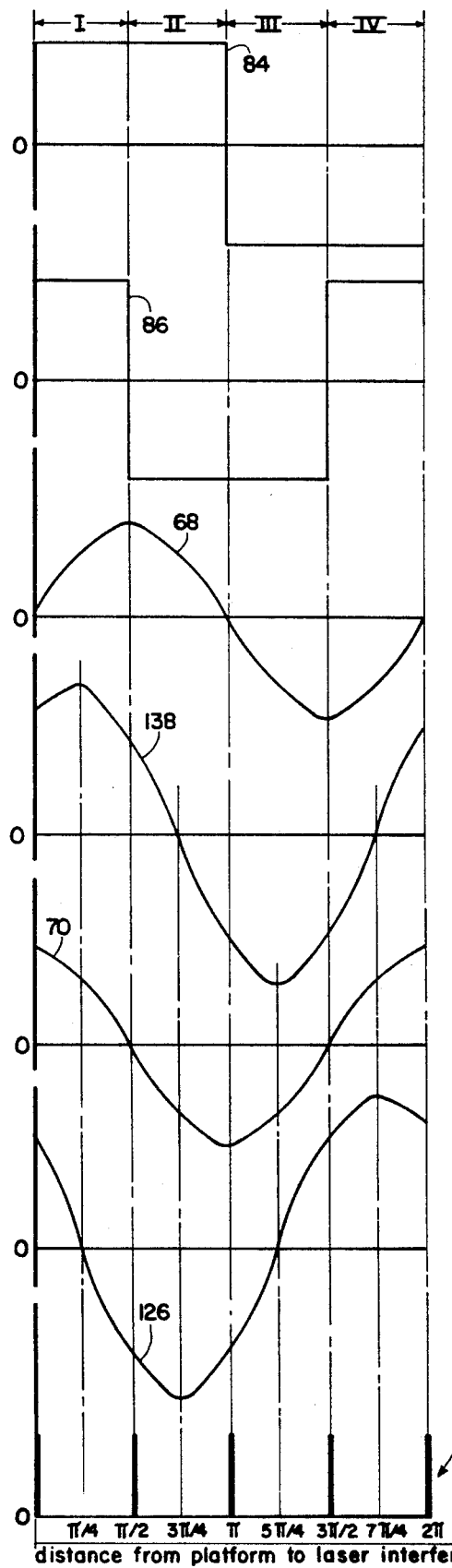

Other objects and many of the attendant advantages of the present invention will be better appreciated and said invention will become clearly understood by reference to the following detailed description when considered in conjunction with the accompanying drawings illustrating one embodiment of the instant invention, wherein:

FIG. 1 provides a simplified diagrammatic representation of the subject invention, partially in perspective;

FIG. 2 provides a schematic representation of the laser interferometer shown in FIG. 1;

FIG. 3 provides a simplified functional block diagram of the instant invention;

FIG. 4 provides a functional block diagram of the velocity control network of FIG. 3;

FIG. 5 provides a functional block diagram illustrating the invention of FIG. 3 in more detail; and FIG. 6 provides a graphical illustration of the various signal wave-shapes appearing at different points in the circuitry of the subject invention.

Referring to the drawings in more detail and, more particularly, to FIG. 1 thereof, the subject invention is shown generally at 10 including a base 12 comprising material having high stiffness and exhibiting low hysteresis, such as granite. A platform 14 is slideably mounted on the base 12, as by air bearings, for axial movement thereacross and may typically support a fixture 16 for holding a workpiece such as a lens. A linear motor 18 is secured to the base 12 and includes a shaft 19 which is magnetically coupled to the platform 14 in a well-known manner. The linear motor 18 is of the moving coil type and is essentially like a loudspeaker driver such that the shaft 19 moves axially inward and outward of the motor 18 carrying with it a platform 14, magnetically coupled thereto.

A laser interferometer 21, such as a Model No. INF-1 laser interferometer manufactured by the Perkin-Elmer Corporation of Norwalk, Conn., is secured to the base 12 outwardly of one end of the platform 14. A retroreflector, or target prism, 23 is secured to said end of the platform 14, in general alignment with the laser interferometer 21, whereby light emanating from said interferometer 21 may be reflected back thereto by the retroreflector 23.

An electronic control network 25 is connected to the motor 18 and supplies signals thereto which regulate the velocity and position of the shaft 19 and, hence, the platform 14. Movement of the platform 14 will cause the laser interferometer to emit a plurality of output signals (in a manner to be more fully described infra) which are supplied to the electronic control network 25 at the terminals 26, 27, 28 and 29.

The output signals at the terminals 26, 27, 28 and 29, respectively, will effect a change in the signals transmitted by the electronic control network 25 to the motor 18 which will compensate for any deviation of the platform 14 from its predetermined position or velocity.

Referring again to FIG. 2, the laser interferometer 21 is shown including a helium-neon laser 31 for providing a plane polarized coherent light output 32, which is caused to diverge by a diverging lens 34. The output from the lens 34 is passed through a quarter wave plate 36 which emits a circularly polarized output beam 38. The circularly polarized beam 38 is passed through a collimating lens assembly 40 where it is collimated and passes to a beam splitter 42.

The beam splitter 42 transmits a portion 44 of the beam 38 to the retroreflector 23 and internally reflects a portion 46 of the beam 38 in a direction normal to that of the beam 44. It should be noted that the beam portion 44 will be circularly polarized in the same direction as the beam 38 while the beam portion 46 will be circularly polarized in the opposite direction. The beam portion 44 is then internally reflected within the retroreflector 23 and emerges parallel to its path of entry but with a reversal of its polarization.

A portion 48 of the beam portion 46 is reflected within the beam splitter 42 and emanates therefrom with its direction parallel with that of the beam 38 and with the same polarization. The beam portion 44 emanating from the retroreflector 23 is sent back to the beam splitter 42 which transmits a portion 50 thereof, without changing the direction of its polarization and combines said portion 50 with the beam portion 48. The combined beam portions 48 and 50 are then condensed by a lens 52 and transmitted to a beam splitter 54 which will reflect a portion 56 and transmit a portion 58 normal to said portion 56.

The beam portion 56 will be transmitted through a polarizing screen 60 to a photodetector 62 and the portion 58 will be transmitted through a polarizing screen 64 to a similar photodetector 66.

It will be recalled that, as best seen in FIGS. 1, 3, 4 and 5, the retroreflector 23 is secured to one end of the platform 14 so as to be movable therewith. Thus, the length of the path traversed by the beam portion 44 will vary with the position of the platform 14. Also, it will be recalled that the beam portions 48 and 50 are circularly polarized in opposite directions.

The varying path length of the beam portion 44 will cause it to be out of phase with the beam portion 46, whereby the portions 48 and 50 will interfere to effect linearly polarized light whose plane of polarization rotates 180° per half-wavelength movement of the retroreflector 23 and the platform 14. By properly positioning the polarizing screens 60 and 64, proper phasing can be established between the signal seen by the photodetectors 62 and 66 such that they see sine or cosine functions of their respective beam portions 56 and 58.

For purposes of this description we will assume that the polarizing screens 60 and 64 are so positioned that the photodetectors 62 and 66 will respectively see sine and cosine functions of their respective beam portions 56 and 58. Clearly, then, the photodetectors 62 and 66 will provide sine and cosine output signals 68 and 70, respectively, (FIG. 6) which vary sinusoidally with the position of the platform 14 and the retroreflector 23.

The output signals 68 and 70 will be amplified in the preamplifiers 72 and 74, respectively, and appear at the respective output terminals 26 and 27. A pair of clipper amplifiers 80 and 82 are connected in parallel with the output terminals 26 and 27, respectively, and serve to suitably shape the amplified signals 68 and 70 to provide square wave output signals 84 and 86, respectively, (FIG. 6) at the respective output terminals 28 and 29.

Referring again to FIG. 3, the electronic control network 25 (FIG. 1) is seen to include a velocity control network 88, a velocity feedback network 90, and a phase-lock network 92. A switch 94, such as a common single pole, double-throw switch, alternately connects the velocity control network 88 or the phase-lock network 92 through a power amplifier 96, to the linear motor 18.

When the velocity control network 88 is connected to the linear motor 18, it provides a DC velocity control signal thereto of a level corresponding to a predetermined velocity. The velocity control network 88 is also connected to the output terminals 28 and 29 of the laser interferometer 21 and receives square wave output signals 84 and 86, respectively, therefrom. The control network 88 operates upon the signals 84 and 86, in a manner to be more fully described hereinafter, so as to determine the average velocity of the platform 14 therefrom. The velocity control network 88 then generates a DC output signal, corresponding to said average velocity, which it compares with said velocity control signal so as to generate a velocity error signal corresponding to any difference between the predetermined and attained velocity of the platform 14. The velocity error signal is fed to the linear motor 18 via the switch 94 and the power amplifier 96 so as to increase or decrease the velocity of the platform 14, as is appropriate.

When the platform 14 approaches a predetermined position, at its previously determined velocity, the velocity control network 88 is disconnected from the amplifier 96 and the linear motor 18 and the phase-lock network 92 is connected in its place. The phase-lock network 92 is connected to the output terminals 26 and 27 of the laser interferometer 21 and receives sine and cosine signals 68 and 70, respectively, therefrom. The phase-lock network 92 operates upon the signals 68 and 70 to generate an error signal corresponding to the difference in phase between the signals 68 and 70 and the setting of a reference signal source about which more will be said infra. This phase difference error signal is amplified and fed to the linear motor 18 and causes the shaft 19 and the platform 14 to seek a predetermined position such that the signals 68 and 70 differ from the reference source setting by a predetermined phase angle.

The velocity feedback network 90 is connected to the output terminals 26, 27, 28 and 29 of the laser interferometer 21 so as to receive sine and cosine output signals 68 and 70, respectively, and their corresponding square wave signals 84 and 86, respectively. The velocity feedback network 90 determines the instantaneous velocity of the platform 14 from the sine and cosine outputs 68 and 70, respectively, appearing at the terminals 26 and 27, respectively. The square wave output signals 84 and 86 appearing at the output terminals 28 and 29, respectively, are fed into the velocity feedback network 90 to perform a gating function, in connection with the determination of the instantaneous velocity of the platform 14, which will be more fully described infra.

Referring to FIG. 4 in more detail, the velocity control network 88, of FIG. 3, is seen to include a DC operational amplifier 98 which is connected through the switch 94 to the power amplifier 96, which drives the linear motor 18 and the platform 14. A potentiometer 100, or the like, is connected across a DC supply 102 and to the input of the DC operational amplifier 98 so as to provide a controlled DC input signal thereto corresponding to a predetermined velocity of the platform 14. This controlled DC input signal will be fed, through the switch 94 and the power amplifier 96, to the linear motor 18 to accelerate the platform 14 in a direction dependent upon the polarity of the DC control signal from the potentiometer 100.

It will be recalled that the square wave signals 84 and 86 are generated by amplifying and clipping the sine and cosine signals 68 and 70, respectively, and are therefore phase displaced by $\pi/2$ radians. Accordingly, either the signal 84 or the signal 86 will cross zero every $\pi/2$ radians.

Quadrature logic circuitry 104 is connected to the output terminals 28 and 29 of the laser interferometer 21 (FIGS. 1, 2, 3 and 5) so as to receive the square wave signals 84 and 86, respectively, therefrom.

The quadrature logic circuitry 104 comprises a series of gates interconnected in a manner commonly practised in the art to generate a pulsed output signal 106 (FIG. 6) wherein a pulse occurs each time the signal 84 or the signal 86 crosses zero. The polarity of the pulses comprising the signal 106 depends on the direction of movement of the platform 14 (FIGS. 1, 3 and 5) and it will be assumed, for purposes of the discussion herein, that movement of the platform 14 toward the linear motor 18 will cause the pulses of the signal 106 to be positive. The direction of movement of the platform 14 will be determined by the quadrature logic circuitry 104 by detecting whether the signal 84 or 86, as the case may be, crosses zero from positive to negative or from negative to positive, while at the same time noting whether the other of the signals 84 and 86 is positive or negative.

As best seen in FIG. 6, the direction of zero crossing of one of the signals 84 or 86 will be different for any particular DC level of the other of the signals 84 or 86, depending upon whether the signals 84 and 86 are being generated from left to right or from right to left. Thus, as illustrated in FIG. 6, with the square wave signals 84 and 86 (and, of course, the sine and cosine signals 68 and 70, respectively) being generated from left to right, corresponding to movement of the platform 14 toward the motor 18, the pulses comprising the signal 106 will all be positive and will occur every $\pi/2$ radians.

It should be noted at this point that where the platform 14 moves both toward and away from the motor 18 the output signal 106, from the quadrature logic circuitry 104, will comprise a series of positive and negative pulses with the positive pulses occuring during the movement of the platform 14 toward the motor 18 and with the negative pulses occuring while the platform 14 moves away from the motor 18 and toward the laser interferometer 21. Obviously, although the pulses comprising the signal 106 are evenly spaced (every $\pi/2$ radians, or quarter wavelength of the light emanating from the laser interferometer) with respect to the distance of the platform 14 from the laser interferometer 21, these pulses will not be evenly spaced in time and their frequency will be dependent upon the velocity of the platform 14.

The signal 106 is supplied to a low-pass filter 108 which provides a DC level output (not shown) whose level depends upon the frequency of the pulses comprising the signal 106 and their polarity. Thus, where the platform 14 is moving in one direction, all of the pulses in the signal 106 will be in one direction and a DC output will be provided by the low-pass filter 108 of a level corresponding to the frequency of the pulses in the signal 106 and of a polarity dependent upon the direction of movement of the platform 14. However, where the platform 14 is moving back and forth or oscillating about a point, so to speak, the low-pass filter 108 will provide a DC output signal of a level indicative of the average or net velocity of the platform 14.

It is to be noted that the quadrature logic circuitry 104 is so designed that the polarity of the pulses comprising the signal 106 for any particular direction of travel of the platform 14 will be opposite to the direction of the DC signal supplied by the potentiometer 100 to the DC operational amplifier 98. Also, the low-pass filter 108 is connected to the DC operational amplifier 98 such that its DC output signal is combined with the DC signal from the potentiometer 100. Clearly, then, the average velocity signal provided by the low-pass filter 108 will tend to null the signal provided by the potentiometer 100 when the platform 14 attains a predetermined velocity. Any difference between the velocity of the platform 14 and that predetermined by the setting of the potentiometer 100 will be reflected as an error signal, at the input of the DC operational amplifier 98, which will be fed through the switch 14 and the power amplifier 96 to the linear motor 18 so as to cause the platform 14 to accelerate to the predetermined velocity, effectively nulling the signal at the input of the DC operational amplifier 98.

It will be recalled that after the platform 14 has attained its predetermined velocity, and as it approaches a predetermined position (about which more will appear infra), the velocity control network 88 is disconnected from the power amplifier 96 by the switch 94 and the phase-lock network 92 (FIG. 3) is connected to said power amplifier 96 with the platform 14 continuing to move under its own momentum (opposed solely by frictional forces).

Referring again to FIG. 5, the phase-lock network 92 (FIG. 3) is shown to include a sine-cosine potentiometer 110 which provides DC output signals to a pair of multipliers 112 and 114 (such as Model No. MU 401 manufactured by GPS Instrument Co., Inc., of Newton, Mass.). The level of the DC signal supplied to the multiplier 112 from the sine-cosine potentiometer 110 is a function of the cosine of the angular setting, which we may designate $\beta$, of the potentiometer 110 and the level of the DC signal supplied to the multiplier 114 is a function of the sine of the setting, $\beta$, of the potentiometer 110. The cosine and sine related DC signals supplied by the sine-cosine potentiometer 110 are the reference signals referred to hereinabove.

The multipliers 112 and 114 are connected to the output terminals 27 and 26, respectively, of the laser interferometer 21 and receive the sine and cosine output signals 68 and 70, respectively, therefrom. Now, if we represent the cosine signal 70, (FIG. 6) as A cos $\theta$, the sine signal 68 as A sine $\theta$, the DC signal supplied to the multiplier 112 as B cos $\beta$ and that supplied to the multiplier 114 as B sine $\beta$, the multipliers 112 and 114 will provide output signals which can be represented as C cos $\theta$ cos $\beta$ and C sine $\theta$ sine $\beta$, respectively, where A, B and C are constants and $\theta$ represents the phase of the output signals 68 and 70 from the laser interferometer 21.

The output signals from the multipliers 112 and 114 are passed through a pair of RC networks 116 and 118, respectively, which affect the frequency response of the network by adjusting the gain with respect to frequency so as to provide stability. Each of the RC networks 116 and 118 includes a resistor connected in parallel with a capacitor and said networks 116 and 118 are connected in series between the multipliers 112 and 114, respectively, and a DC operational amplifier 120.

The output signals from the multipliers 112 and 114 are passed through the RC networks 116 and 118 and are summed by the DC operational amplifier 120 to yield an output signal indicative of the phase error between the setting of the sine-cosine potentiometer 110 and the phase of the sine and cosine output signals 68 and 70 from the laser interferometer 21.

The output signal from the DC operational amplifier 120 will take the form C cos ($\beta-\theta$). Thus, whenever the phase difference between the setting of the sine-cosine potentiometer 110 and the sine and cosine signals 68 and 70, respectively, from the laser interferometer 21 is equal to $\pi/2$ radians; the output signal from the DC operational amplifier 120 (due to the sum of the signals from the RC networks 116 and 118) will be zero since the cosine function C cos $(\beta-\theta)$ crosses zero when $(\beta-\theta)=\pm\pi/2$ radians.

Whenever the phase-lock network 92 is connected to the power amplifier 96 by the switch 94, the phase error cosine signal from the DC operational amplifier 120 will be fed through the power amplifier 96 to the linear motor 18 so as to drive the platform 14 to such a position that the phase angles of the output signals 68 and 70, from the laser interferometer 21, differ from the setting of the sine-cosine potentiometer 110 by $\pm\pi/2$ radians. More simply, the platform 14 will seek a position such that the phase error signal emanating from the DC operational amplifier 120 will be zero or nulled.

It is desired to bring the platform 14 to a precise predetermined position in response to a specific setting of the sine-cosine potentiometer 110. However, it will be recalled that the phase error cosine output signal from the DC operational amplifier 120 will be zero whenever $(\beta-\theta)=\pm\pi/2$ radians. Inasmuch as there are two possible phase angles of the sine and cosine signals 68 and 70, respectively, which will null the phase error output signal from the operational amplifier 120, an apparent ambiguity is created. The word "apparent" is used because an ambiguity does not, in fact, exist as a stable phase-lock can be achieved at only one of these phase angles.

Consider that the phase-lock network 92 has been connected to the power amplifier 96 by the switch 94, that the sine-cosine potentiometer is set at 8 $\pi/9$ radians, or 160° and that the platform 14 is momentarily at a position where the phase angle of the sine and cosine signals 68 and 70, respectively, is 0 radians, or degrees. Consider, further, that a positive signal from the DC operational amplifier 120 will tend to drive the platform 14 away from the linear motor 18 and that a negative signal from said operational amplifier 120 will drive the platform 14 toward the linear motor 18.

Inasmuch as the sine-cosine potentiometer 110 is set at 160° it would appear that a null will be achieved in the phase output signal from the operational amplifier 120 (tending to bring the platform 14 to rest) when the position of the platform 14 is such that the phase angle of the sine and cosine output signals 68 and 70, respectively, from the laser interferometer 21 is equal to 70° (corresponding to a phase angle for the error signal from the operational amplifier 120 of $\pi/2$ radians) or when the position of the platform 14 is such that the phase angle of the sine and cosine signals 68 and 70, respectively, is 250° (corresponding to a phase angle for the error signal from the DC operational amplifier 120 of $-\pi/2$ radians).

Consider now that the platform 14 is at a position corresponding to a phase angle of 60° in the sine and cosine output signals 68 and 70, respectively. The phase of the error signal from the DC operational amplifier 120 will be (160°-60°) or 100°. Thus, the phase error signal will be negative (the cosine function being negative in the second quadrant) tending to move the platform 14 toward the linear motor 18 and further away from the null position of 70° with respect to the sine and cosine signals 68 and 70, respectively.

If the platform 14 were at a position corresponding to a phase angle of 80° with respect to the sine and cosine signals 68 and 70, respectively, the phase error signal from the DC operational amplifier 120 would have a phase angle of (160°-0°) or 80°. In this latter case, the phase error signal would be positive and would tend to move the platform 14 away from the linear motor 18 and further away from the apparent null position of 70° with respect to the phase of the sine and cosine signals 68 and 70, respectively. Clearly, then, although the phase error output signal from the DC operational amplifier 120 will null when the platform 14 is in a position corresponding to a phase angle (with respect to the sine and cosine output signals 68 and 70, respectively) of 70°, the platform 14 will be unable to stabilize in this position.

Assume now that the platform 14 is at a position corresponding to a phase angle of 240° with respect to the sine and cosine output signals 68 and 70, respectively. The phase angle of the phase error signal from the DC operational amplifier 120 will now be, assuming, of course, that the sine-cosine potentiometer 110 is still set at a phase angle of 160°, (160°-240°) or -80°.

Since the cosine function is positive in the quadrant from 0 to -90°, the phase error signal will be positive and will tend to drive the platform 14 away from the linear motor 18 and toward the null position corresponding to a phase angle of 250° with respect to the sine and cosine output signals 68 and 70, respectively.

If the platform 14 were to move beyond this null position, say to a position corresponding to a phase angle of 260° with respect to the sine and cosine output signals 68 and 70, respectively, the phase angle of the phase error signal would become (160°-260°) or -100°. Inasmuch as the cosine function of angles between -90° and -270° is negative, the phase error signal from the operational amplifier 120 will now be negative and will tend to drive the platform 14 toward the linear motor 18 and hence toward the null position of 250° with respect to the phase of the output signals 68 and 70. It is readily apparent that the platform will seek a position corresponding to a phase angle of 250°, with respect to the signals 68 and 70, when the sine-cosine potentiometer 110 is set at 160° and that this position of the platform 14 will be a stable one.

It should be noted that while the phase-lock network 92 has been described so as to generate a phase error signal corresponding to the cosine of the difference between the setting of the sine-cosine potentiometer 110 and the phase of the sine and cosine signals 68 and 70, respectively, it would be just as feasible to generate an error signal corresponding to the sine of such difference in phase.

To generate such a sine phase error signal it is merely necessary to invert the output signal appearing at the terminal 27 of the laser interferometer 21 and to couple such inverted output signal to the multiplier 114 while disconnecting the output terminal 26 from the multiplier 114 and connecting said terminal 26 to the multiplier 112 (of course the output terminal 27 is no longer connected to the multiplier 112). Now, when the output signals from the multipliers 112 and 114 are summed in the operational amplifier 120, the phase error function will take the form sine $\theta$ cosine $\beta-$ cosine $\theta$ sine $\beta$ which corresponds to the function sine $(\theta-\beta)$.

Clearly, where a sine phase error function is generated as opposed to a cosine phase error function, the stable platform will tend to null at a position wherein the phase angle of the signals 68 and 70 correspond exactly to the setting of the sine-cosine potentiometer 110. In contradistinction, it will be recalled that when a cosine phase error signal is generated the platform seeks a null position $\pi/2$ radians from the setting of the sine-cosine potentiometer 110.

It will be recalled that the platform 14 is moving at a predetermined velocity when the velocity control network 88 is connected to the power amplifier 96 via the switch 94. The platform 14 will continue to move under the influence of its own momentum when the velocity control network 88 is switched off and the phase-lock network 92 is connected to the power amplifier 96. The momentum of the platform 14 may be sufficient to carry it beyond the stable null position.

If the momentum of the platform 14 is sufficient it may cause the platform 14 to move $\pi$ radians beyond its stable null position at which time the sine of the phase error signal from the DC operational amplifier 120 will change so as to accelerate the platform 14 in the same direction. This accelerating signal will continue for a period of $\pi$ radians with respect to the phase of the phase error signal from the DC operational amplifier 120.

During the time interval that the platform 14 is being accelerated in the direction of its velocity by the phase error signal from the DC operational amplifier 120, said platform 14 may acquire sufficient momentum to again carry it beyond its stable null position. This phenomenon is known to designers of servocontrol systems as "cogging" and may often be perceived by an intermittent or jerking motion on the part of the controlled body. In order to provide the extremely high-accuracy requirements of the present invention, the cogging phenomena is eliminated by means of the velocity feedback network 90 of FIG. 3.

Referring again to FIG. 5, the velocity feedback network 90 is shown connected to the input of the DC operational amplifier 120 of the phase-lock network 92. The velocity feedback network 90 provides output signals indicative of the instantaneous velocity of the platform 14 and these signals are negatively fed back to the input of the DC operational amplifier 120 where they are summed with the phase error signal and fed therewith to the power amplifier 96 and the linear motor 18 so as to oppose the velocity of the platform 14 and bring it quickly to rest at its stable null position.

It will be recalled that the output signals 68 and 70 from the laser interferometer 21 vary sinusoidally with the distance of the platform 14 from the laser interferometer 21. However, inasmuch as the platform 14 is moving with a given velocity, the distance between the platform 14 and the laser interferometer 21 will vary with time as will the frequency and, hence, the slope of the signals 68 and 70.

Accordingly, the signals 68 and 70 contain velocity information which may be obtained by differentiating these signals and utilizing the resultant signal to provide a velocity feedback signal to the DC operational amplifier 120. By way of example, either the sine wave signal 68 or the cosine wave signal 70 may be differentiated and subsequently inverted or not, as the case may be, depending on the direction of travel of the platform 14, and the quadrant of the output signals 68 and 70 corresponding to the position of said platform 14. Thus, when the platform 14 is in a position corresponding to the first quadrant of the signals 68 and 70 and is moving with a given velocity away from the laser interferometer 21, a velocity feedback signal may be provided by differentiating the sine wave signal 68 emanating from terminal 26 of the laser interferometer 21. This signal may be inverted to provide proper feedback to the DC operational amplifier 120.

When the platform 14 passes to a position corresponding to the second quadrant of the signals 68 and 70, differentiation of the signal 68 might be utilized to provide proper feedback without the necessity of inverting such differentiated signal (provided the platform is still moving away from the laser interferometer 21). Also, the signal 70 might just as easily be the signal chosen for differentiation to provide the proper velocity feedback to the DC operational amplifier 120, as the signal 68.

However, neither the sine nor the cosine functions (and hence neither the output signals 68 nor 70) are sufficiently linear within any of their four quadrants to provide a velocity feedback signal of the desired accuracy. Nevertheless, it has been found that both the sine and cosine functions (and hence the output signals 68 and 70) provide sufficient linearity for the derivation of a velocity feedback signal within the portion $\pm\pi/4$ radians of their zero crossover points.

Inasmuch as either the sine or the cosine function crosses zero every $\pi/2$ radians, it is evident that a suitably linear region for providing an appropriate velocity feedback signal is present in either the signal 68 or the signal 70 at all times. Hence, it is evident that we may obtain a suitable velocity feedback signal by differentiating (and inverting where appropriate) the sine and cosine signals 68 and 70, respectively, within the region $\pm\pi/4$ radians of their respective zero crossover points. Such a procedure is indirectly performed by the velocity feedback network 90 in an ingenious manner to be described in more detail infra.

Referring to FIG. 5, in more detail, the velocity feedback network 90 is seen to include a summing network 122 which is connected to the output terminal 27 of the laser interferometer 21 and through an inverter 124 to the other output terminal 26 of said laser interferometer 21. The summing network 122 may commonly comprise a DC operational amplifier and serves to subtract the sine wave signal 68 from the cosine wave signal 70 to yield a cosine function output 126 (FIG. 6) of the form $D \cos(\theta + \pi/4)$ where D is some constant.

Thus, the output function 126 will lead the output function 70 by $\pi/4$ radians or 45°. The output signal 126 is fed to a differentiating network 128 where it is differentiated and passed to a four-channel multiplex switch 130 (such as Model No. A35-3700-19, manufactured by Fairchild Semiconductor Division, Fairchild Camera and Instrument Corporation, Mt. View, California 94040) via a signal path 132 and an inverter 134 connected in parallel therewith. Thus, the derivative of the signal 126 is provided to the four-channel multiplex switch 130 via a signal path 132 and the negative of the derivative of the signal 126 is provided to said multiplex switch 130 via the inverter 134.

Another summing network 136, essentially the same as the summing network 122, is connected to the output terminals 26 and 27 of the laser interferometer 21 to receive the output signals 68 and 70, respectively, therefrom. The summing network 136 sums the signals 68 and 70 to yield an output signal function 138 of the form $D \sin(\theta + \pi/4)$ where D is any constant as above and $\theta$ represents the phase of the signal 68 (and hence the signal 70). The output signal 138 from the summing network 136 is fed to a differentiating network 140 which is connected to the four-channel multiplex switch 130 through a signal path 142 and an inverter 144, essentially the same as the inverter 132. Thus, both the derivative of the output signal 138 and the negative thereof are supplied to the four-channel multiplex switch 130.

Looking again to FIG. 6, and particularly to the four quadrants identified by the roman numerals I, II, III and IV, it is seen that the square wave output signals 84 and 86 provide a ready means of identification as to which of the four quadrants, I, II, III or IV or the sine and cosine output functions 68 and 70, respectively, the position of the platform 14 corresponds to at any given moment.

For example, in the first quadrant the output signal 84 is positive as is the output signal 86. In the second quadrant the output signal 84 is still positive but the output signal 86 is now negative. In the third quadrant the output signal 84 is now negative and the output signal 86 has remained negative. Finally, in the fourth quadrant the output signal 84 has remained negative and the output signal 86 is now positive.

Furthermore, the output signal functions 84 and 86 provide a ready means of identification for the direction of travel of the platform 14. For example, whenever either of the signals 84 or 86 crosses zero, the other of the signals 84 and 86 is at a given DC level. Of course, the DC level maintained by one of the signals 84 and 86, while the other of the signals 84 and 86 is crossing zero, is independent of the direction of travel of the platform 14. However, the direction of zero crossing (for example, from + to −, or − to +) of the signal 84 or 86, as the case may be, changes with respect to whether the platform 14 is moving toward or away from the laser interferometer 21 and hence whether the signals 68, 70, 84, and 86 are being generated from left to right or right to left (as seen in FIG. 6).

Also, it can readily be seen that the segment of the cosine signal 126 falling within the first quadrant is that linear portion of the signal 126 encompassed within the region $\pm\pi/4$ radians with respect to its zero crossover point. Similarly, the second quadrant encompasses the linear region of the sine function 138 within $\pm\pi/4$ radians of its zero crossover point. In the third quadrant we see that the region within $\pm\pi/4$ radians of the zero crossover point of the cosine function 126 is linear. Finally, in the fourth quadrant we see that the region of the sine function 138 encompassed within $\pm\pi/4$ radians of its zero crossover point is linear.

It should now be apparent that extremely accurate velocity information can be determined by differentiating the cosine function 126 when we are in the first quadrant, differentiating the sine function 138 when the position of the platform 14, corresponds to the second quadrant of the signals 68 and 70, differentiating the cosine function 126 when the position of the platform 14 corresponds to the third quadrant with respect to the functions 68 and 70, and by differentiating the sine function 138 when the position of the platform 14 corresponds to the fourth quadrant with respect to the sine and cosine functions 68 and 70, respectively.

At this time it will be recalled that the derivative of the signal 126 and the negative thereof is continually supplied to the four-channel multiplex switch 130 via the signal paths 132 and the inverter 134, respectively. Similarly, it will be recalled that the derivative of the signal 138 and the negative thereof are continually supplied to the four-channel multiplex switch 130 via the signal path 142 and the inverter 144, respectively.

However, we have seen that, depending upon what quadrant the position of the platform 14 corresponds to, only one of the output signals 126 or 138 provides sufficiently accurate velocity information at anytime to provide suitable velocity feedback to the DC operational amplifier 120. Thus, it should be apparent that a suitable velocity feedback signal may be provided to the DC operational amplifier 120 if we selectively gate the derivative of one of the signals 126 or 138 or its inverse (depending upon the position of the platform 14) through the four-channel multiplex switch 130 to the DC operational amplifier 120. It is precisely this function that is performed by a quadrature logic network 146 and the multiplex switch 130.

The quadrature logic network 146 is connected to the terminals 28 and 29 of the laser interferometer 21 so as to receive the square wave output signals 84 and 86, respectively, therefrom. The quadrature logic network 146 includes four output terminals 148, 150, 152 and 154 which are connected to the multiplex switch 130 in a well-known manner such that a suitable signal present at the terminal 148 will gate the signal from the signal path 132 through the switch 130, while a suitable signal present at the output terminal 150 will gate the inverse of the signal appearing on this signal path 132 through the switch 130. In a like manner, a signal appearing at the terminal 152 will gate the signal appearing at the signal path 142 through the multiplex switch 130 while a signal appearing at the terminal 154 will gate the inverse of the signal passing through the path 142 through the switch 130.

More particularly, the quadrature logic network 146 comprises a plurality of gates interconnected in a manner obvious to those skilled in the art such that a suitable output signal will appear at the terminal 148 when the platform 14 is in a position corresponding to the first quadrant (of the signals 68, 70, 84, and 86). A suitable signal will appear at the terminal 150 when the platform 14 is in the second quadrant (corresponding to said signal 68, 70, 84, and 86). Similarly, when the platform 14 is in the third quadrant aforesaid, a suitable signal will appear at the terminal 152 and when the platform 14 is in the fourth quadrant aforesaid, a suitable signal will appear at the terminal 154. The signals at the output terminals 148, 150, 152 and 154 will be such as to gate the appropriate one of the signals appearing at signal paths 132 and 142 or its inverse to said switch 130 so as to cause the linear motor 18 to oppose the velocity of the platform 14.

By way of example, if we consider that the linear motor is so connected as to cause the platform 14 to approach the laser interferometer 21 in response to a negative DC signal and to cause the platform 14 to move away from the laser interferometer 21 in response to a positive DC signal, it is apparent that if the platform is moving away from the laser interferometer 21, and is passing through a position corresponding to the first quadrant of the output signals from said laser interferometer 21, then a signal will appear at the output terminal 148 and will gate the signal appearing at the signal path 132 through the multiplex switch so as to be fed back to the input of the DC operational amplifier 120 from whence it will be supplied to the power amplifier 126 and thence to the linear motor 18 so as to cause the velocity of the platform 14 to decrease toward zero.

As the platform enters a position corresponding to the second quadrant of the signals from the laser interferometer 21, a signal will appear at the output terminal 150 causing the multiplex switch 130 to pass the signal appearing at the signal path 142 to the input of the DC operational amplifier 120 and ultimately to the linear motor 18 so as to bring the velocity of the platform 14 to 0.

As the platform 14 moves into a position corresponding to the third quadrant aforesaid, a signal will appear at the output terminal 152 which will cause the multiplex switch 130 to pass the signal from the inverter 134 to the operational amplifier 120 and ultimately to the linear motor 18 to continue to oppose the velocity of the platform 14. In a like manner, when the platform 14 is passing through a position corresponding to the fourth quadrant aforesaid, a signal will appear at the output terminal 154 of the quadrature logic network 146 which will enable the signal output from the inverter 144 to pass through said switch 130 to the DC operational amplifier 120 and so on.

If we now consider that the platform is moving in the opposite direction, that is toward the laser interferometer 21, we find that as the platform passes through positions corresponding to the first, second, third and fourth quadrants aforesaid, signals will in turn appear at the output terminals 148, 150, 152 and 154, respectively, so as to gate, in turn, the signals from the signal path 132, the signal path 142, the inverter 134, and the inverter 144 through the multiplex switch 130 to the DC operational amplifier 120 and thence through the power amplifier 96 to the linear motor 18 so as to null the velocity of the platform 14. The greater the velocity of the platform 14 the greater will be the velocity feedback signal passed by the multiplex switch 130 to the DC operational amplifier 120. Consequently, the positioning system 10 will be kept from entering a cogging mode.

It can readily be seen that many variations and modifications of the present invention are possible in light of the aforementioned teachings and it will be apparent to those skilled in the art that various changes in form and arrangement of components may be made to suit requirements without departing from the spirit and scope of the invention. It is therefore to be understood that within the scope of the appended claims, the instant invention may be practised in a manner otherwise than is specifically described herein.

What is claimed is:

1. Apparatus for precisely positioning a slideable platform, including:

motor means connected to said platform for effecting movement thereof;

a laser interferometer operatively connected to said platform for detecting changes in the position thereof and providing an output signal as a function of such changes in position;

means connected to said laser interferometer for receiving said output signal and generating a signal indicative of the average velocity of said platform in response thereto;

means for providing a reference signal corresponding to a predetermined position of said platform;

means for providing a reference signal corresponding to a predetermined velocity of said platform;

means for comparing said output signal with said position reference signal and generating an error signal indicative of the deviation of said platform from a predetermined position;

means for comparing said average velocity signal and said velocity reference signal and generating a velocity error signal corresponding to the deviation of said platform from said predetermined velocity;

means for coupling said velocity error signal to said motor means for causing said platform to seek said predetermined velocity; and means for coupling said position error signal to said motor means whereby said platform will be driven to said predetermined position.

2. The invention as related in claim 1, further including switch means connected to said position error signal coupling means and said velocity error signal coupling means for alternately uncoupling said position error signal and said velocity error signal from said motor means.

3. The invention of claim 2, further including means connected to said laser interferometer for receiving said position output signals, deriving the instantaneous velocity of said platform therefrom, and providing an output signal indicative thereof.

4. The invention as related in claim 3, additionally including means for coupling said instantaneous velocity signal to said motor means so as to accelerate said platform in a direction opposite its velocity.

5. The invention as recited in claim 4, wherein said instantaneous velocity signal coupling means includes means for combining said instantaneous velocity signals with said position error signals.

6. The invention of claim 5, wherein said means for deriving the instantaneous velocity of said platform includes means for differentiating said position output signals.

7. The invention as related in claim 6, wherein said position reference signals and said velocity reference signals are DC level signals.

8. The invention as recited in claim 7, additionally including:
means for generating a pair of phase-displaced pulsed output signals in synchronism with said position output signals; and
means adapted to receive said pulsed output signals for detecting the direction of travel of said platform therefrom and providing a pulsed output signal polarity dependent upon the direction of travel of said platform.

9. The invention of claim 8, further including means for receiving said polarity-dependent pulsed output signal and generating a DC signal responsive thereto of a level dependent upon the frequency and polarity thereof and corresponding to the average velocity of said platform.

10. In apparatus for accurately positioning a sliding platform, the combination including:
motor means for moving said platform;
means for detecting changes in the position of said platform and generating a pair of cyclical output signals phase dependent upon the position of said platform and phase displaced from each other by a predetermined amount;
means for generating a pair of amplitude displaced position reference signals;
means for combining one of said pair of position reference signals with one of said phase displaced cyclical signals;
means for combining the other of said position reference signals with the other of said phase displaced cyclical signals; and
means responsive to said combined signals for providing an output signal indicative of the deviation of said platform from a predetermined position.

11. The invention as related in claim 10, further comprising means for coupling said position deviation signal to said motor means for moving said platform to a predetermined position.

12. The invention as set forth in claim 11, wherein said position reference signals are DC level signals whose amplitudes may be varied as a function of the phase angle of said cyclical output signals corresponding to a predetermined position of said platform.

13. The invention as described in claim 12, wherein said combining means includes:
means for multiplying one of said phase-dependent cyclical output signals with one of said position reference signals; and
means for multiplying the other of said pair of phase-dependent cyclical output signals with the other of said pair of phase displaced position reference signals.

14. The invention as related in claim 13, wherein said phase-dependent dependent cyclical output signals are sinusoidal and are phase displaced $\pi/2$ radians and wherein said position reference signals are amplitude displaced such that the sum of said multiplied signals will provide a sinusoidal function.

15. The invention as set forth in claim 14, further including means adapted to receive said phase-dependent cyclical output signals and determine the instantaneous velocity of said platform therefrom.

16. The invention as described in claim 15 further including means connected to said instantaneous velocity determining means, and adapted to receive said multiplied signals, for providing an output signal to said motor means having a velocity component tending to accelerate said platform in a direction opposite to its velocity.

17. The invention of claim 16, wherein said velocity determining means includes means for subtracting one of said cyclical output signals from the other of said cyclical output signals and means for summing both of said cyclical output signals.

18. The invention as recited in claim 17, further including:
means for differentiating the difference of said cyclical output signals;
means for inverting a portion of the output of said differentiating means so as to provide plural output signals indicative of the derivative of both the difference of said cyclical output signals and the inverse thereof;
means for differentiating the sum of said cyclical output signals; and
means for inverting a portion of the output of said sum differentiating means so as to yield plural output signals indicative of both the derivative of the sum of said cyclical output signals and the inverse thereof.

19. The invention as recited in claim 18, further including means for selectively gating one of said differentiated signals or its inverse to said means connected to said velocity determining means depending on the position of said platform.

20. The invention as described in claim 19, further including means for generating a pair of pulsed output signals phase displaced by $\pi/2$ radians and in synchronism with said pair of phased dependent cyclical output signals.

21. The invention as set forth in claim 19, wherein the output of said subtracting means is a first cyclical signal varying sinusoidally about a voltage level of zero and the sum of said phase-dependent cyclical output signals is a second cyclical signal varying sinusoidally about a voltage level of zero.

22. The invention as specified in claim 21, wherein said gating means includes means for selectively passing only such portions of said first and second cyclical sinusoidal output signals occuring within $\pm\pi/4$ radians of their respective zero crossover points.

23. The invention as related in claim 20, wherein said gating means includes means for receiving said pulsed output signals and determining the quadrant of said phase-dependent cyclical output signals corresponding to the position of said platform.

24. The invention as related in claim 23, wherein said quadrant detecting means provides four outputs; each of said four outputs corresponding to positioning of said platform in a different one of four quadrants with respect to said phase-dependent cyclical output signals.

25. The invention of claim 24, wherein said means for providing said position reference signals comprises a sine-cosine potentiometer.

26. The invention of claim 25, further including means connected to said motor means for imparting a predetermined velocity of said platform.

27. The invention as recited in claim 26, wherein said means for imparting a predetermined velocity to said platform includes:
means for generating a reference signal corresponding to a predetermined velocity of said platform;
means for determining the average velocity of said platform;
means for comparing said average velocity with said predetermined velocity and generating an error signal corresponding to the difference therebetween; and
means for coupling said velocity error signal to said motor means for bringing the velocity of said platform to that predetermined.

28. The invention as stated in claim 27, wherein said means for determining the average velocity of said platform incorporates means for generating a pulse train of a frequency corresponding to the sum of the zero crossovers of said pair of pulsed output signals and of a polarity corresponding to the direction of travel of said platform.

29. The invention as portrayed in claim 28, further including means for receiving said pulsed train and generating a DC output signal of a polarity corresponding to the average polarity of the pulses comprising said pulse train and of a level corresponding to the average velocity of said platform.

30. The invention as set forth in claim 29, wherein said means for providing output signals phase dependent on the position of said platform comprises a laser interferometer.

31. In apparatus for precisely positioning a movable platform, the combination including:
means operatively connected to said platform to provide sine and cosine output signals phase dependent on the position of said platform;
means for providing a pair of DC level reference signals corresponding to the sine and cosine, respectively, of a predetermined phase angle with respect to said phase-dependent sine and cosine signals;
means for multiplying one of said DC level reference signals and one of said sine and cosine phase-dependent signals;
means for multiplying the other of said reference signals and the other of said sine and cosine phase-dependent signals; and
means for summing said multiplied signals to yield an output signal indicative of the difference between said predetermined phase angle and the instantaneous phase angle of said phase-dependent sine and cosine signals.

32. The invention as set forth in claim 31, wherein said means for providing said reference signals comprises a sine-cosine potentiometer.

33. The invention of claim 22, further including:
motor means for moving said platform;
means coupling said motor means and said phase angle difference output signal, whereby said platform will seek a position such that said phase angle difference output signal will be nulled.

34. The invention as cited in claim 33, wherein said means for providing position dependent sine and cosine signals comprises a laser interferometer; and further including means responsive to said sine and cosine position dependent signals for determining the instantaneous velocity of said platform therefrom and providing a feedback signal to said coupling means indicative thereof.

35. The invention of claim 34, additionally including:
means connected to said laser interferometer for generating a first sinusoidal signal phase displaced from one of said sine and cosine position dependent signals by $\pi/4$ radians and a second sinusoidal signal displaced from the other of said sine and cosine position dependent signals by $\pi/4$ radians; said first and second sinusoidal signals being phase displaced from each other by $\pi/2$ radians and cyclically varying about a DC reference level; and
means for providing said velocity feedback signal by differentiating said first and second sinusoidal signals and selectively passing only such portions of said differentiated signals as occur in the region $\pm\pi/4$ radians with respect to the reference level crossover points of said first and second sinusoidal signals, respectively.

36. The invention as described in claim 35, wherein said means for providing said first sinusoidal signal includes means for subtracting one of said sine and cosine position dependent signals from the other of said sine and cosine position dependent signals; and said means for providing said second sinusoidal signal includes means for summing said sine and cosine position dependent signals.

37. The invention as set forth in claim 36, wherein said cosine corresponding reference signal is multiplied by said cosine position dependent signal and said sine corresponding reference signal is multiplied by said sine position dependent signal, whereby said sum of said multiplied signals will be a cosine function of the difference in phase between said sine and cosine position dependent signals and said predetermined phase angle.

38. The invention as cited in claim 37, wherein said means for subtracting one of said sine and cosine position dependent signals from the other of said sine and cosine position dependent signals includes means for inverting one of said sine and cosine position dependent signals and means for summing said inverted signal with other of said sine and cosine position dependent signals; and wherein said means for driving said platform comprises a linear motor.

39. The invention as related in claim 38, wherein said sine position dependent signal is subtracted from said cosine position dependent signal to yield a sinusoidal signal corresponding to said cosine position dependent signal, but advanced in phase $\pi/4$ radians with respect thereto; and wherein said sine position dependent signal is summed with said cosine position dependent signal to yield a sinusoidal output signal corresponding to said sine position dependent signal but advanced in phase $\pi/4$ radians with respect thereto.

* * * * *